United States Patent Office 3,418,162
Patented Dec. 24, 1968

3,418,162
COMPOSITION OF WATERPROOF AGENT AND PROCESS FOR MANUFACTURE OF WATERPROOF CLOTH USING THE SAME
Nobuyuki Adachi, Annaka-shi, Japan, assignor to The Shin-etsu Chemical Industry Company, Limited, Tokyo, Japan, a corporation of Japan
No Drawing. Filed Dec. 1, 1964, Ser. No. 415,152
Claims priority, application Japan, Dec. 7, 1963, 38/65,838; June 13, 1964, 39/33,361
6 Claims. (Cl. 117—161)

ABSTRACT OF THE DISCLOSURE

A waterproofing composition comprising (1) a hydroxyl terminated polydimethylsiloxane, (2) a methyl hydrogen polysiloxane, (3) an aminoalkyloxysilane, (4) a tetravalent organotin compound, and (5) an organic solvent. The invention also includes the combination of said waterproofing composition and an organic resin. The invention further includes cloth which is waterproofed with the aforesaid compositions and the processes for preparing said waterproofed cloth.

---

This invention relates to a composition of matter for the manufacture of a waterproof cloth and a process for the manufacture of a waterproof cloth.

A number of processes have been already proposed for the manufacture of a waterproof cloth and many products have been already manufactured according to the said processes. However, those processes belong to any of the following two types. That is, one of the said processes is to treat a cloth by immersing it in an emulsion or solution of an aluminum or zirconium soap, or a water repellent material such as paraffine, silicone, pyridine and others, or by spraying the said emulsion or solution on to the cloth, and then carrying out drying and heat treatment. In the said process, water-repellent film is formed around each individual fiber composing the cloth, and thus the excellent water-repellent property can be imparted to the cloth, but in this case the clearance between fibers, namely, the mesh of cloth is not clogged so that the hydraulic resistance is very poor. The water-repellent property is also reduced due to the friction and crumpling during the washing on application. Such is a disadvantage of the said process. Conventional silicone water-repellents, for example, the repellents according to U.S. Patents 2,588,366, and 2,612,482 and the like, are entirely based on the said process. In the case of the process, there has been a disadvantage to select the cloth having dense texture for the high hydraulic resistance.

Another process is to coat the surface of a cloth with a high polymer resin solution of a synthetic rubber, polyvinyl chloride, polyacrylic acid, polyurethane and the like and carrying out vulcanization, if necessary, after the evaporation of the solvent and form a waterproof film on the surface of the cloth. In the said process, the mesh of cloth is clogged with the said high polymer film, so that the waterproof property of cloth can be remarkably improved. However, as these resins have no water-repellent property, the waterproof cloth prepared according to the said process has such a disadvantage as incompleteness of water-repellency. In order to eliminate such a disadvantage, it is necessary to carry out the water-repelling treatment of the said cloth further with the above mentioned paraffine or silicone water-repellent. Therefore, the said process requires two-step treatment.

The object of the present invention is to eliminate such disadvantages as conventional processes have and to provide a silicone composition for readily manufacturing a waterproof cloth excellent in both water-repellent property and waterproof property and a process for the manufacture of waterproof cloth using the said composition. That is the present invention relates to a composition consisting of (1) a linear dimethyl polysiloxane having a hydroxyl group combined with a terminal silicon atom, (2) a methyl hydrogen polysiloxane having the formula:

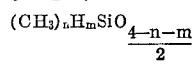

where $n=1.0\sim1.5$, $m=0.75\sim1.25$, and $m+n=2.0\sim2.25$, (3) amino alkyl alkoxysilane having the formula:

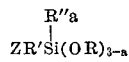

where R represents an alkyl group having less than 4 carbon atoms, R' is an alkylene group having more than 3 carbon atoms, Z is an amino group or polyamino alkyl group combined to R' through a carbon-nitrogen bond, R" is an alkyl group of less than 4 carbon atoms or phenyl group, and $a$ represents 0 or 1, (4) an organotin compound having the formula:

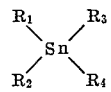

where $R_1$, $R_2$, $R_3$ and $R_4$ represent alkyl or acyl groups of less than 18 carbon atoms or phenyl groups, and (5) organic solvent, and to a process for the manufacture of waterproof cloth, which is characterized by coating the surface of the cloth with the said composition and carrying out heat treatment thereof after the evaporation of solvent.

Further explanation will be hereunder made in detail. The composition of the present invention is prepared by simply mixing the said constituents. For example, it is prepared by blending (1) from 5 to 50 parts by weight of linear polysiloxane having hydroxyl group combined with silicon at the terminal of molecule, (2) from 0.3 to 30 parts by weight of methyl hydrogen polysiloxane, (3) from 0.02 to 5 parts by weight of amino alkyl alkoxysilane, (4) from 0.1 to 5 parts by weight of organotin compound, and (5) from 35 to 95 parts of organic solvent. However, if methyl hydrogen polysiloxane is used in an excess proportion to the linear dimethyl polysiloxane having hydroxyl group combined with silicon at the terminal of molecule in this case, the viscosity of the said solution decreases and thus it becomes hard to apply the coating on the cloth. On the other hand, if the amount of methyl hydrogen polysiloxane is too small, a weak film is brought about at the heat treatment of the coated surface. Therefore, it is desirable that the ratio of dimethylpolysiloxane to methylhydrogenpolysiloxane is $5:1\sim20:1$, preferably about $10:1$. Addition of pigment or coloring agent such as titanium oxide, aluminum oxide, calcium carbonate, silica and the like may be carried out at discretion if necessary.

According to the method of the present invention, the treatment of cloth is generally carried out by coating the cloth with the said solution by means of knife coater or roller coater, where the viscosity of the said solution is desirable in a range of 1,000 to 100,000 cps. for the most cases and 5,000 to 20,000 cps. for the preferable case in view of operational efficiency, and the concentration of resin is desirable in a range of from 5 to 50%, preferably from 10 to 30%. The viscosity and concentration can be adjusted by the amount of organic solvent to be added according to the processing apparatus, processing speed, kind of cloth, the amount of coating and the like.

There is no special restriction to the cloth to be treated according to the method of the present invention. In other words, nylon, Dacron (polyester), polypropylene fiber, cellulose acetate, bemberg, rayon, cotton, and other can be applied. However, a good effect can be generally obtained in case of cloth having a texture consisting of long filament fibers with less raised nap. The amount of resin to be applied on these cloth is desirable at more than 3 grams per m.² of cloth for the ordinary case, and 5 to 30 grams for a preferable case. In carrying out the said processing, such a method as heating is carried out at from 60° to 100° C. for from 30 seconds to 5 minutes after the coating with the said treating solution to distill off the solvent and then further heating is carried out at from 120° to 180° C. for from 10 seconds to 5 minutes is employed, whereby the resin components is subjected to polymerization and condensation, resulting in hardening. In this method, the objective waterproof cloth can be readily obtained. The waterproof cloth thus obtained has a coating of silicone resin having a special structure on the surface thereof and has a variety of excellent effects as follows: Namely, the waterproof cloth prepared in the conventional, well-known process, for example, the cloth coated with acrylic resin or urethane resin, lacks in the water-repellent and light-resistant properties. Further, these resins are readily attached by the solvent, and thus there is such a drawback as the said waterproof effect is readily lost through dry cleaning. The cloth treated with vinyl chloride and urethane resin is particularly inferior in the light-resistant property. For example, through the sun light irradation in a short period of time, the color of cloth is readily changed into yellow and the cloth becomes deteriorated. The cloth treated with the conventional water-repellent agent of paraffin series or silicone lacks in the waterproof property, moreover there is such as drawback as the water-repellent film drops off through the repeated washing. On the other hand, in the cloth obtained in the present invention, the resin components extend to the fine texture of cloth owing to lower surface tension property of silicone resin used in the said treatment, and are subjected to hardening through the succeeding heat treatment, whereby the excellent water-repellent property as well as the water-proof property characteristic of the silicone resin can be imparted on the treated surface. Because of the lower surface tension property of silicone resin, a part of said resin composition treated on the cloth is easy to diffuse from its coated side to the back side.

As a result, both sides of such cloths treated as taffeta or twill become to have less wettable and rapid-drying property owing to its good water repellency. Moreover this coating film is not attached with the solvent, such as trichloroethylene, perchloroethylene, mineral turpentine, and therefore the waterproof property is not decreased through the repeated dry cleaning and no change nor deterioration is brought about at all through the sun light irradiation for a long period of time. Such effects can be imparted to the cloth coated according to the present invention. The film of silicone resin formed through coating according to the method of the present invention can endure hard friction, repeated crumpling and flexing sufficiently, and thus the cloth obtained according to the method of the present invention is imparted with such a property as durable in severe service. Further, the film obtained in the present invention has a good stretching and flexible property and thus the strain from the outside is widely dispersed. So, in the cloth thus obtained, the tearing strength is remarkably improved, as compared with that of the original cloth, often reaching up to 200%. This fact is industrially important to the cellulose acetate and bemberg cloth which has poor tearing strength.

The mechanism of imparting the waterproof and water-repellent property to the cloth treated according to the method of the present invention is explained as follows: Methyl hydrogen polysiloxane used in the present invention acts as the bridging agent to develop polysiloxane having the terminal hydroxyl group into a higher polymer substance, and further the said aminoalkyl alkoxysilane acts as the controlling agent for the said reaction rate, whereby the soft and powerful waterproof film is assumed to be formed on the objective cloth together with the presence of organotin compound as the reaction catalyst. However, it is not always definitely clear in this case what action aminoalkyl alkoxysilane actually performs. In case that aminoalkyl alkoxysilane is not added, it is observed that the viscosity of the solution rapidly increases and thereby the processing operation becomes very difficult, and further the film thus obtained becomes very weak. The waterproof cloth thus obtained tends to be cracked readily through the friction and washing and the waterproof and water-repellent property decreases. Further, in case that aminoalkyl alkoxysilane is provided on the fiber in advance and the composition of matter having the above-mentioned blending ratio free of aminoalkyl alkoxysilane is coated thereon, only such waterproof cloth not good in the friction resistance and washing resistance is obtained. In view of the above facts, it seems that aminoalkyl alkoxysilane controls the reaction rate and takes an important role in the formation of soft and powerful film on the fiber. The wide change of solution viscosity is unpreferable in industrial application, therefore the addition of aminoalkylalkoxysilane is necessary.

Linear polysiloxane having hydroxyl group combined with silicon at the terminal of molecule, used in the present invention has the following general formula:

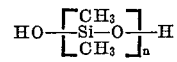

where $n$ represents the positive integer, and it is desirable for the purpose of the present invention that it has a viscosity of higher than 10,000 cps. at 25° C. The said polymer can be prepared, for example, by the well-known process where octamethyl cyclotetrasiloxane $$[(CH_3)_2SiO]_4$$

is polymerized with caustic potassium as the catalyst, and the polymer having a low viscosity can be obtained by heating the said high viscosity polymer with water to more than about 100° C.

Further, methyl hydrogen polysiloxane is linear or cyclic polymer having the following general formula as the constitutional unit:

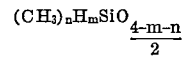

where $n=1.0\sim1.5$, $m=0.75\sim1.25$, and $m+n=2.0\sim2.5$. For example, such linear polysiloxane having the following formula as prepared by the simultaneous hydrolysis of trimethyl monochlorosilane and methyl dichlorosilane:

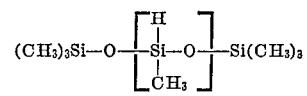

where $n$ is the positive integer.

Aminoalkyl alkoxysilane, another material used in the method of the present invention, is represented by the general formula,

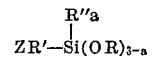

where R is alkyl group having less than 4 carbon atoms, R' alkylene group having more than 3 carbon atoms, R" alkyl group having less than 4 carbon atoms or phenyl group, $a$ represents 0 or 1, and Z amino group or polyaminoalkyl group combined to R' through carbon-nitrogen bond, and is, for example, represented by the following molecules:

$$H_2NCH_2CH_2CH_2Si(OC_2H_5)_3$$

$$H_2NCH_2CH_2CH_2Si(OC_3H_7)_3$$

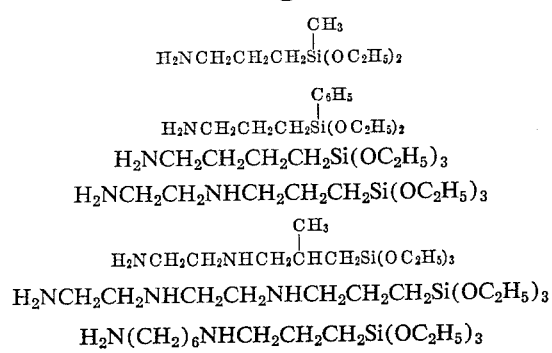

$$H_2NCH_2CH_2CH_2Si(OC_2H_5)_3$$

$$H_2NCH_2CH_2NHCH_2CH_2CH_2Si(OC_2H_5)_3$$

$$\underset{\underset{CH_3}{|}}{H_2NCH_2CH_2NHCH_2CHCH_2Si(OC_2H_5)_3}$$

$$H_2NCH_2CH_2NHCH_2CH_2NHCH_2CH_2CH_2Si(OC_2H_5)_3$$

$$H_2N(CH_2)_6NHCH_2CH_2CH_2Si(OC_2H_5)_3$$

Some of the said molecules can be obtained by the methods indicated in U.S. Patent 2,832,754 where alpha-halogenoalkyl alkoxy silane is subjected to reaction with ammonia or the method indicated in U.S. Patent 2,971,864, where further reaction thereof with polyamine is carried out. The amount of aminoalkyl alkoxysilane is preferably added by 0.2~5% in respect of the total amount of said polysiloxane.

The organotin compound well-known in the treatment of silicone series water-repellent can be used. For example, dibutyl tin diacetate, dibutyl tin dilaurate, dibutyl tin dioctoate, trimethyltin acetate, dioctyltin diacetate, dibutyltin acetate. For the solvent used in the present invention, there is not a special restriction so long as the said solvent can dissolve the said respective constituent, but is inert thereto. Generally, trichloroethylene, perchloroethylene, benzene, toluene, mineral spirit and the like are in practice.

It is preferable that the composition of the present invention is used together with the well-known water-proofing agent, for example, a resin component selected from ester of acrylic acid, urethane resin, and chlorosulphonated polyethylene, in addition to the above-mentioned constituents, whereby expensive silicone constituent can be effectively saved. In the present invention, the well-known resins used together with the above-mentioned composition are acrylic ester resin, urethane resin and chlorosulphonated polyethylene. Copolymer of acrylic acid resin with metacrylic ester, acrylonitrile, styrene, butadiene and the like may be used if necessary, but in the most cases, copolymer mainly of butylacrylate with acrylonitrile which has the best hand and good adhesion with the fiber is used. For urethane resin, those prepared from polyester especially having 2 or 3 hydroxyl groups at the terminal and multi-functional isocyanate are preferable. For chlorosulfonated polyethylene, those ordinarily, market-available ones having a molecular weight of from 10,000 to 100,0000 are in practice.

Further explanation of the method of the present invention will be made hereunder with reference to examples.

EXAMPLE 1

(1) Preparation of raw material

Octamethyl cyclotetrasiloxane, $[(CH_3)_2SiO]_4$, was heated at 150° C. for 3 hours with 0.001% by weight of caustic soda in respect to the weight of the former to prepare dimethyl polysiloxane having hydroxyl group at the terminal and a viscosity of 8,000,000 cps., and 95 parts of monomethyl dichlorosilane, $CH_3HSiCl_2$ and 5 parts of trimethyl chlorosilane, $(CH_3)_3SiCl$ underwent simultaneous hydrolysis at 25° C. to prepare methyl hydrogen polysiloxane having a viscosity of 17 cps.

On the other hand, trichlorosilane and alkyl chloride underwent reduction in the presence of $H_2PtCl_6$ catalyst and were boiled to distill off γ-chloropropyl trichlorosilane having a boiling point of 183° C., which was then subjected to reaction at room temperature with methanol in a molar ratio of 1:3 to form γ-chloropropyl trimethoxysilane. Then, the resulting γ-chloropropyl trimethoxysilane was added into a stream of excess ethylene diamine refluxing from the top of the distilling column and cooled. The upper layer separated from the said two-layer solution was subjected to the distillation, whereby pure $$H_2N-CH_2CH_2NHCH_2CH_2CH_2Si(OCH_3)_3$$

which boiling point is 140.5° C. (15 mm. Hg column) was obtained.

(2) Preparation of treating solution

The substances obtained in the foregoing were combined and blended as in Table 1, and dissolved in trichloroethylene to obtain a viscosity of about 9,000 cps. suitable for knife coating and added finally with dibutyl tin dilaurate.

TABLE 1

| | Sample Number | Dimethyl siloxane (parts by weight) | Methyl hydrogen polysiloxane (parts by weight) | $H_2NCH_2CH_2HNCH_2$ $CH_2CH_2Si(OMe)_3$ (parts by weight) | Trichloroethylene (parts by weight) | Dibutyl tin dilaurate (parts by weight) |
|---|---|---|---|---|---|---|
| Runs | 1 | 18 | 2 | 0.03 | 79.8 | 0.2 |
| | 2 | 18 | 2 | 0.1 | 79.7 | 0.2 |
| | 3 | 18 | 2 | 0.5 | 79.3 | 0.2 |
| Comparison | 4 | 18 | 2 | ------ | 79.8 | 0.2 |
| | 5 | 18 | ------ | 2.0 | 79.8 | 0.2 |

(3) Processing of cloth

The said solutions were coated respectively on the nylon taffeta cloth with knife coater so as to coat the cloth evenly at 10 grams per m.² with the said treating resin, and then, heat treatment was carried out at 90° C. for 3 minutes and further at 140° C. for 3 minutes. For comparison, the cloth coated with acryl resin (Sample Number 6) and the cloth further treated with silicon series water repellent (market-available emulsion type) (Sample Number 7) were prepared. Namely, seven kinds of test samples were prepared. Then, the water-repellent property and water-proof property were measured, of these samples, for the finished cloth (prior to the dry cleaning), the cloth subjected to the shaking in trichlene at 25° C. for 30 minutes (after the dry cleaning) and the cloth subjected to crumpling which took place 500 times under the pressure of 1 kg. using a Scott type folding and abrading tester, and the result thereof is shown in Table 2.

TABLE 2

| | Sample Number | Finished cloth | | Cloth after dry cleaning | | Cloth after crumpling resistance test | |
|---|---|---|---|---|---|---|---|
| | | Water repellence | Water proofness (mm.) | Water repellence | Water proofness (mm.) | Water proofness | Water proofness (mm.) |
| Example | 1 | 100 | 1,020 | 100 | 450 | 90 | 400 |
| | 2 | 100 | 1,050 | 100 | 1,010 | 100 | 970 |
| | 3 | 100 | 910 | 100 | 890 | 100 | 890 |
| Comparison | 4 | 100 | 1,030 | 70 | 210 | 60 | 130 |
| | 5 | 0 | 60 | 0 | 20 | 0 | 20 |
| | 6 | 50 | 250 | 30 | 30 | 50 | 170 |
| | 7 | 100 | 300 | 80 | 70 | 80 | 190 |

EXAMPLE 2

The above-mentioned linear dimethyl polysiloxane having hydroxyl group at the terminal of molecule was dissolved in solvent in advance, and other constituents were thereto added. In this way, the test solutions having the composition as shown in Table 3 were prepared and the change in viscosity of these solutions was determined at room temperature (25° C.) The results are shown in Table 4.

TABLE 3

| Sample Number | Dimethyl polysiloxane (parts by weight) | Methyl hydrogen polysiloxane (parts by weight) | Amino alkyl alkoxy-silane (parts by weight) | Organo metallic compound (parts by weight) | Trichloroethylene (parts by weight) |
| --- | --- | --- | --- | --- | --- |
| 8  | 20.0 | ---- | [1] 0.2 | [2] 0.6 | 79.2 |
| 9  | 18.0 | 2.0 | [1] 0.2 | ---- | 79.8 |
| 10 | 18.0 | 2.0 | ---- | [2] 0.6 | 79.4 |
| 11 | 18.0 | 2.0 | [1] 0.2 | [2] 0.6 | 79.2 |
| 12 | 20.0 | ---- | [3] 0.2 | [4] 0.7 | 79.1 |
| 13 | 18.0 | 2.0 | [3] 0.2 | ---- | 79.8 |
| 14 | 18.0 | 2.0 | ---- | [4] 0.7 | 79.3 |
| 15 | 18.0 | 2.0 | [3] 0.1 | [4] 0.7 | 79.1 |
| 16 | 18.0 | 2.0 | [5] 0.2 | [4] 0.7 | 79.1 |

[1] $H_2N(CH_2)_3Si(OC_2H_5)$.
[2] Dibutyl tin dioctoate.
[3] $H_2N(CH_2)_2NH(CH_2)_3Si(OCH_3)$.
[4] Dibutyl tin dilaurate.
[5] $H_2NCH_2CH_2NH$.

TABLE 4

| Sample Number | After Preparation, cp. | After 1 hr., cp. | After 5 hr., cp. | After 24 hr., cp. |
| --- | --- | --- | --- | --- |
| 8  | 9,200 | 9,300 | 9,300 | 9,400 |
| 9  | 8,500 | 8,500 | 8,600 | 8,600 |
| 10 | 8,700 | 23,500 | 125,000 | [1] |
| 11 | 8,400 | 8,500 | 8,500 | 8,600 |
| 12 | 9,300 | 9,300 | 9,500 | 9,650 |
| 13 | 8,600 | 8,600 | 86,00 | 8,700 |
| 14 | 8,750 | 35,000 | [2] | [1] |
| 15 | 8,400 | 8,400 | 8,500 | 8,500 |
| 16 | 8,950 | 15,300 | 36,800 | [2] |

[1] Complete hardening. [2] Almost hardened.

Then, the test solutions just right after the preparation were evenly coated on the Dacron taffeta cloth with the doctor knife so that 30 g. of the test solution, namely 6 g. of the resin component, may be adhered on the cloth per 1 m.$^2$ of cloth, and the coated cloth was immediately heated to 90° C. for 3 minutes to evaporate the solvent and further heated to 140° C. for 3 minutes. For the waterproof cloth thus obtained and those washed under the condition of AATCC No. 2, the water proofness and the water repellence of both sides of cloth were measured, and the results as shown in Table 5 was obtained. The method for the measurement was in accordance with AATCC 22–1952.

TABLE 5

| Sample Number | Cloth before washing | | | Cloth after washing | | |
| --- | --- | --- | --- | --- | --- | --- |
|  | Hydraulic resistance, mm. | Water repellency of coated side | Water repellency of back side | Hydraulic resistance, mm. | Water repellency of coated side | Water repellency of back side |
| 8  | 50 | 0 | 0 | 25 | 0 | 0 |
| 9  | 50 | 0 | 0 | 20 | 0 | 0 |
| 10 | <1,000 | 100 | 100 | 250 | 80 | 60 |
| 11 | <1,000 | 100 | 100 | <1,000 | 100 | 100 |
| 12 | 45 | 0 | 0 | 20 | 0 | 0 |
| 13 | 45 | 0 | 0 | 20 | 0 | 0 |
| 14 | <1,000 | 100 | 100 | 270 | 70 | 60 |
| 15 | <1,000 | 100 | 100 | <1,000 | 100 | 100 |
| 16 | 400 | 90 | 90 | 85 | 60 | 0 |

EXAMPLE 3

The above-mentioned linear dimethylpolysiloxane having hydroxyl group at the terminal of molecule and methyl hydrogen polysiloxane were blended with $$H_2NOH_2CH_2CH_2\overset{\overset{\displaystyle CH_3}{|}}{Si}(OC_2H_5)_2$$

and dibutyltin diacetate as shown in Table 6, and the solutions thus obtained were coated on the Dacron (polyester fiber) tafetta cloth so that the resin may be adhered at 8 grams/m.$^2$, and then heat treatment was carried out at 90° C. for 3 minutes and 120° C. for 5 minutes, whereby the waterproof cloth was obtained. For these cloths, the water repellence and hydraulic resistance were measured before and after the washing in a way similar to that in Example 2, and the result shown in Table 7 was obtained.

TABLE 6

| Sample No. | Dimethyl siloxane | Methyl hydrogen polysiloxane | $H_2NCH_2CH_2CH_2\underset{\underset{\displaystyle CH_3}{|}}{Si}(OC_2H_5)_2$ | Dibutyl tin diacetate | Perchloroethylene |
| --- | --- | --- | --- | --- | --- |
| 17 | 19.5 | 0.5 | 0.3 | 0.6 | 79.1 |
| 18 | 19.0 | 1.0 | 0.3 | 0.6 | 79.1 |
| 19 | 18.0 | 2.0 | 0.3 | 0.6 | 79.1 |
| 20 | 15.0 | 5.0 | 0.3 | 0.6 | 79.1 |
| 21 | 18.0 | 2.0 | 0.05 | 0.6 | 79.35 |
| 22 | 18.0 | 2.0 | 0.1 | 0.6 | 79.3 |
| 23 | 18.0 | 2.0 | 0.2 | 0.1 | 79.7 |
| 24 | 18.0 | 2.0 | 0.2 | 0.3 | 79.5 |
| 25 | 18.0 | 2.0 | 0.2 | 1.2 | 78.6 |

TABLE 7

| Sample Number | Before washing | | | After washing | | |
| --- | --- | --- | --- | --- | --- | --- |
|  | Hydraulic resistance, mm. | Water repellency of coated side | Water repellency of back side | Hydraulic resistance, mm. | Water repellency of coated side | Water repellency of back side |
| 17 | 850 | 90 | 70 | 420 | 70 | 50 |
| 18 | 980 | 100 | 100 | 910 | 90 | 70 |
| 19 | <1,000 | 100 | 100 | <1,000 | 100 | 100 |
| 20 | <1,000 | 100 | 100 | <1,000 | 100 | 100 |
| 21 | <1,000 | 100 | 100 | 720 | 90 | 80 |
| 22 | <1,000 | 100 | 100 | 1,000 | 100 | 90 |
| 23 | <620 | 80 | 70 | 270 | 60 | 50 |
| 24 | <1,000 | 100 | 100 | 950 | 100 | 90 |
| 25 | <1,000 | 100 | 100 | 1,000 | 100 | 100 |

EXAMPLE 4

Coating was made, in varied amount of resin to be adhered, to the nylon taffeta and polypropylene fiber canvas sheet using the solution of Sample Number 11 in Example 2, and heat treatment was carried out at 90° C. for 3 minutes and at 120° C. for 5 minutes, whereby the waterproof cloth was obtained. The water repellence and hydraulic resistance of cloth thus obtained were measured, and the result as shown in Table 8 was obtained.

TABLE 8

| Sample Number | Amount of resin adhered, g./m.² | Nylon taffeta | | | Polypropylene canvas | | |
|---|---|---|---|---|---|---|---|
| | | Hydraulic resistance, mm. | Water repellency of coated side | Water repellency back side | Hydraulic resistance, mm. | Water repellency of coated side | Water repellency of back side |
| 26 | 3.0 | 240 | 100 | 90 | | | |
| 27 | 5.0 | 930 | 100 | 100 | 160 | 100 | 50 |
| 28 | 10.0 | <1,000 | 100 | 100 | 340 | 100 | 60 |
| 29 | 15.0 | <1,000 | 100 | 100 | 820 | 100 | 70 |
| 30 | | | | | <1,000 | 100 | 90 |

EXAMPLE 5

Silicone having a composition of Sample Number 15 in Example 2 and market-available acrylic acid resin (copolymer of butyl acrylate and acrylonitrile) were blended in various proportion and were dissolved in trichloroethylene so that the total resin content may amount to 15%. Then, the solution was coated on the acetate taffeta so that the resin may be adhered at 5 grams/m.², and the heat treatment was carried out at 90° C. for 3 minutes and further at 140° C. for 5 minutes. For comparison, the cloth coated with silicone alone, the cloth coated with acrylic acid resin alone, the cloth subjected to the water-repellent treatment with market-available emulsion-type silicone water repellent after the coating of acrylic acid resin, and further the cloth subjected to the water-repellent treatment only with the said emulsion-type, silicone water-repellent were subjected to the said treatment, likewise. In the processing with the said emulsion-type, silicone water-repellent, dilution was made to the solution with water so that the silicone content may reach 4%, and the cloth to be treated was immersed in the solution. After the squeezing of the cloth with mangle, heat treatment was carried out to the treated cloth at 90° C. for 5 minutes and further at 160° C. for 5 minutes.

The waterproof cloth thus obtained was subjected to dry cleaning in perchloroethylene for 30 minutes and change of the water-repellent property and the hydraulic resistance thereof was observed. The result thus obtained is shown in Table 9. The tearing strength and the flex abrasion resistance of the cloth prior to the dry cleaning were determined according to CCC-T-191b and the result thereof is shown in Table 10.

from 5 to 50 parts by weight of a hydroxyl terminated polydimethylsiloxane having a viscosity higher than 10,000 cps. at 25° C., (2) from 0.3 to 30 parts by weight of methyl hydrogen polysiloxane represented by the general formula, $$(CH_3)_n H_m SiO_{\frac{4-n-m}{2}}$$

where $n=1.0-1.5$, $m=0.75-1.25$ and $n+m=2.0-2.25$, (3) from 0.02 to 5 parts by weight of aminoalkylalkoxysilane represented by the general formula, $$ZR'\overset{R''_a}{\underset{|}{Si}}(OR)_{3-a}$$

wherein R is an alkyl group having less than 4 carbon atoms, R' is an alkylene group having more than 3 carbon atoms, R'' is selected from the group consisting of alkyl groups having less than 4 carbon atoms and phenyl groups, Z is selected from the group consisting of amino and polyaminoalkyl groups bonded to R' through a carbon-nitrogen bond, and $a$ represents zero to 1, (4) from 0.1 to 5 parts by weight of organotin compound represented by the general formula,

where $R_1$, $R_2$, $R_3$ and $R_4$ are each selected from the group consisting of alkyl and acyl groups containing less than 18 carbon atoms, and phenyl groups, and (5) from 35 to 95 parts by weight of organic solvent.

2. A process for the manufacture of waterproof cloth, characterized by applying a solvent containing composition of a waterproofing agent to a cloth, evaporating said solvent and then heat-treating said cloth, said solvent containing composition comprising (1) from 5 to 50

TABLE 9

| Sample Number | Silicone resin | Acrylic ester resin | Before dry cleaning | | | After dry cleaning | | |
|---|---|---|---|---|---|---|---|---|
| | | | Hydraulic resistance, mm. | Water repellency of coated side | Water repellency of back side | Hydraulic resistance, mm. | Water repellency of coated side | Water repellency of back side |
| 31 | 100 | | 820 | 100 | 100 | 860 | 100 | 100 |
| 32 | 80 | 20 | 790 | 100 | 100 | 770 | 100 | 100 |
| 33 | 60 | 40 | 750 | 100 | 100 | 490 | 90 | 90 |
| 34 | 40 | 60 | 700 | 100 | 90 | 330 | 90 | 80 |
| 35 | 20 | 80 | 520 | 80 | 60 | 120 | 60 | 50 |
| 36 | | 100 | 460 | 50 | 0 | 45 | 0 | 0 |
| 37 | Silicone water repellent treatment after acrylic acid resin coating. | | 610 | 90 | 100 | 125 | 80 | 80 |
| 38 | Only silicone water repellent treatment | | 190 | 100 | 100 | 110 | 80 | 80 |

TABLE 10

| Sample Number | Silicone resin | Acrylic acid ester resin | Tearing strength (pounds) | | Flex Abrasion Resistance (cycles) | |
|---|---|---|---|---|---|---|
| | | | Warp | Fill | Warp | Fill |
| 31 | 100 | | 12.3 | 10.9 | 142 | 73 |
| 32 | 80 | 20 | 11.7 | 10.8 | 130 | 69 |
| 33 | 60 | 40 | 10.5 | 9.7 | 112 | 67 |
| 34 | 40 | 60 | 8.1 | 7.5 | 108 | 61 |
| 35 | 20 | 80 | 6.0 | 4.3 | 102 | 57 |
| 36 | | 100 | 2.9 | 1.9 | 89 | 42 |
| (Original Cloth) | | | 4.4 | 3.0 | 86 | 45 |

What I claim is:

1. A waterproofing composition which comprises (1)

parts by weight of a hydroxyl terminated polydimethylsiloxane having a viscosity less than 10,000 cps. at 25° C., (2) from 0.3 to 30 parts by weight of methyl hydrogen polysiloxane represented by the general formula, $$(CH_3)_n H_m SiO_{\frac{4-n-m}{2}}$$

where $n=1.0-1.5$, $m=0.75-1.25$ and $n+m=2.0-2.25$, (3) from 0.02 to 5 parts by weight of aminoalkylalkoxysilane represented by the general formula,

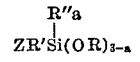

wherein R is an alkyl group having less than 4 carbon atoms, R' is an alkylene group having more than 3 carbon atoms, R″ is selected from the group consisting of alkyl groups having less than 4 carbon atoms and phenyl groups, Z is selected from the group consisting of amino and polyaminoalkyl groups bonded to R′ through a carbon-nitrogen bond, and $a$ represents 0 to 1, (4) from 0.1 to 5 parts by weight of organotin compound represented by the general formula,

wherein $R_1$, $R_2$, $R_3$ and $R_4$ are each selected from the group consisting of alkyl and acyl groups containing less than 18 carbon atoms and phenyl groups, and (5) from 35 to 95 parts by weight of organic solvent.

3. A process according to claim 2 wherein the composition of the waterproofing agent is applied to the cloth in a ratio of from 3 to 30 grams of resins of said agent per 1 square meter of the cloth, and the cloth is heated at a temperature of from 60° to 100° C. to evaporate said solvent, and then at a temperature of 120° to 180° C.

4. A composition having waterproofing characteristics, which comprises a mixture of (A) from 5 to 200 parts by weight of a resin composition consisting of (1) from 5 to 50 parts by weight of a hydroxyl terminated polydimethylsiloxane having a viscosity higher than 10,000 cps. at 25° C., (2) from 0.3 to 3 parts by weight of methyl hydrogen polysiloxane represented by the general formula,

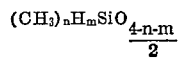

where $n=1.0-1.5$, $m=0.75-1.25$ and $n+m=2.0-2.25$, (3) from 0.02 to 5 parts by weight of aminoalkylalkoxysilane represented by the general formula,

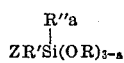

wherein R is an alkyl group having less than 4 carbon atoms, R′ is an alkylene group having more than 3 carbon atoms, R″ is selected from the group consisting of alkyl groups having less than 4 carbon atoms, and phenyl groups, Z is selected from the group consisting of amino and polyaminoalkyl groups bonded to R′ through a carbon-nitrogen bond, and $a$ represents 0 to 1, (4) from 0.1 to 5 parts by weight of organotin compound represented by the general formula,

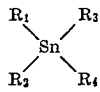

wherein $R_1$, $R_2$, $R_3$ and $R_4$ are each selected from the group consisting of alkyl and acyl groups, containing less than 18 carbon atoms and phenyl groups, and (5) from 35 to 95 parts by weight of organic solvent, and (B) 100 parts by weight of at least one resin selected from the group consisting of acrylic acid ester resin, urethane resin, chlorosulphonated polyethylene.

5. A process for the manufacture of waterproof cloth, which is characterized by applying a solvent containing composition having water-proofing characteristics to a cloth, evaporating said solvent, and then heat-treating, said solvent containing composition comprising a mixture of (A) from 5 to 200 parts by weight of the resin composition consisting of (1) from 5 to 50 parts by weight of hydroxyl terminated polydimethylsiloxane having a viscosity higher than 10,000 cps. at 25° C. (2) from 0.3 to 30 parts by weight of methyl hydrogen polysiloxane represented by the general formula,

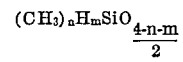

where $n=1.0-1.5$, $m=0.75-1.25$ and $n+m=2.0-2.25$, (3) from 0.02 to 5 parts by weight of aminoalkylalkoxysilane represented by the general formula,

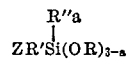

wherein R is an alkyl group having less than 4 carbon atoms, R′ is an alkylene group having more than 3 carbon atoms, R″ is selected from the group consisting of alkyl groups having less than 4 carbon atoms and phenyl groups, Z is selected from the group consisting of an amino and polyaminoalkyl groups bonded to R′ thorugh a carbon-nitrogen bond, and $a$ represents 0 to 1, (4) from 0.1 to 5 parts by weight of organotin compound represented by the general formula

where $R_1$, $R_2$, $R_3$ and $R_4$ are each selected from the group consisting of alkyl and acyl groups containing less than 18 carbon atoms, and phenyl groups, and (5) from 35 to 95 parts by weight of organic solvent, and (B) 100 parts by weight of at least one resin selected from the group consisting of acrylic acid ester resin, urethane resin, chlorosulphonated polyethylene.

6. A process according to claim 5, wherein the composition having waterproofing characteristics is applied to the cloth in a ratio of from 3 to 30 grams of resin of the composition per square meter of the cloth, and the cloth is heated at a temperaure of 60° to 100° C. to evaporate the solvent, and then at a temperature of 120° to 180° C.

References Cited

UNITED STATES PATENTS

| | | | |
|---|---|---|---|
| 2,985,544 | 5/1923 | Monterey et al. | 117—161 |
| 2,985,545 | 5/1923 | Leavitt | 117—161 |
| 3,247,281 | 4/1966 | Gagliardi | 260—825 |
| 3,303,048 | 2/1967 | Cooper et al. | 117—135.5 |

WILLIAM D. MARTIN, *Primary Examiner.*

THEODORE G. DAVIS, *Assistant Examiner.*

U.S. Cl. X.R.

117—135.5, 138.8, 143, 145; 260—825